Patented July 25, 1950

2,516,108

UNITED STATES PATENT OFFICE 2,516,108

ARALKOXYALKYLIMIDAZOLINES

Carl Djerassi, Chatham, and Caesar R. Scholz, Summit, N. J., assignors to Ciba Pharmaceutical Products, Incorporated, Summit, N. J., a corporation of New Jersey No Drawing. Application July 13, 1946, Serial No. 683,410

12 Claims. (Cl. 260—309.6)

The present invention relates to a new and valuable group of compounds which may be characterized as 2-aralkoxyalkyl imidazolines, and to methods for the preparation thereof.

It has been found that the aforesaid new 2-aralkoxyalkyl imidazolines, the formula for which may be set forth as

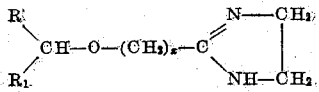

wherein R stands for an aryl group such as phenyl and the like, $R_1$ may be a hydrogen atom, an aryl group (such as phenyl, substituted phenyl, etc.) or an aralkyl group (such as benzyl, phenyl ethyl, etc.), and $x$ represents a small integer, may be prepared according to several processes.

A first process involves reacting a reactive ester, such as a halide, sulfonate, etc. of a 2-hydroxyalkyl imidazoline with a metal alcoholate of the structure

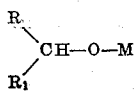

M standing for an alkali metal (e. g. sodium) or an alkaline earth metal (e. g. calcium), and R and $R_1$ having the hereinbefore-given significances.

Illustrative of suitable esters of 2-hydroxyalkyl imidazolines which may be employed as a reactant according to this first process are 2-chloromethyl imidazoline, 2-chlorethyl imidazoline, the corresponding bromo derivatives, etc. Suitable metal alcoholates are, for example, the alkali metal salts derived from benzyl alcohol, benzhydrol, phenyl benzyl carbinol, etc. Anhydrous solvents such as hydrocarbons, as for example benzene, toluene, xylene, cyclohexane or dioxane, may advantageously be employed as reaction media.

Alternatively, the aforesaid new compounds may be prepared by reacting an imido-ether or amidine of the structure

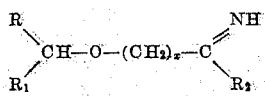

wherein R, $R_1$ and $x$ have the several significances hereinbefore given, and $R_2$ is an alkoxy or an amino group, with a 1,2-diamine such as ethylene diamine, N-methyl-ethylene diamine, and the like.

The new compounds of the present invention are suitable for a variety of purposes. Thus, many of them are useful as intermediates for the production of other organic compounds which may be of therapeutic utility. The new compounds comprise many which are themselves therapeutically active and which, moreover, are characterized by a different and unexpected therapeutic activity as compared to known therapeutically active imidazoline derivatives.

Imidazolines which are substituted in the 2-position are known. Among these 2-substituted imidazolines, those wherein the 2-substituent is an aryloxyalkyl group are known to cause a rise in blood pressure on administration to the animal organism. The known 2-substituted imidazolines, wherein the 2-substituent is a hydrocarbon group, are vasodilators or vasoconstrictors. Other imidazolines having a nitrogen-containing side chain in the 2-position are also known. In contradistinction to these known compounds, the therapeutically active 2-aralkoxyalkyl imidazolines of the present invention are surprisingly characterized by a strong antagonistic action against histamine and acetyl choline. Some of them have an atropine-like action on the eye.

The following examples further characterize the nature of the present invention. These examples are, however, solely illustrative in nature, and the invention is not intended to be restricted thereto or thereby. In these examples, parts by weight bear the same relationship to parts by volume as do grams to cubic centimeters. The temperatures all refer to degrees centigrade.

Example 1

A suspension of 10.4 parts by weight of dry sodium benzylate and 6.2 parts by weight of 2-chloromethyl imidazoline hydrochloride in 60 parts by volume of dry toluene is refluxed for twenty-three hours. After acidification of the reaction mixture and extraction with ether to remove acidic and neutral material, the aqueous solution is made alkaline, extracted with ether, the extract washed with aqueous sodium chloride solution, dried over anhydrous potassium carbonate and evaporated. On treating the residue with ethanolic picric acid, there is obtained 2-benzyloxymethyl imidazoline picrate of melting point 149–152° (corr.) as long, yellow needles.

To a chloroform suspension of the picrate is added aqueous sodium hydroxide solution followed by enough ammonium hydroxide to yield two clear layers on shaking. Evaporation of the dried chloroform layer and treatment with methanolic hydrogen chloride solution, followed by recrystallization from ethylmethylketone-ethanol yields needles of 2-benzyloxymethyl imidazoline hydrochloride melting at 149–151° (cloudy, clearing at 161°).

*Example 2*

A solution of 4.13 parts by weight of benzyloxy-acetonitrile (of boiling point 136–139° at 14 mm. as obtained from chloroacetonitrile and benzyl alcohol in the presence of an acid-binding agent such as sodium) and 1.7 parts by volume of absolute ethanol in dry chloroform is treated with hydrogen chloride gas at 0°. After standing for seventy-two hours in a refrigerator, the solution is evaporated to dryness under reduced pressure and the resulting hygroscopic benzyloxyacet-imidoether hydrochloride is refluxed with an ethanolic solution of 1.8 parts by weight of ethylene diamine. After filtration and concentration, addition of ether causes precipitation of 2-benzyloxymethyl-imidazoline hydrochloride of melting point 149–151°, identical with that obtained in Example 1 and possessing the structure

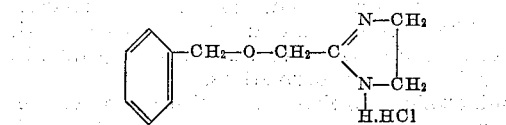

Instead of ethylene diamine, there may be used a N-monoalkylated ethylene diamine. Thus, N - methyl-2-benzyloxymethyl - imidazoline hydrochloride:

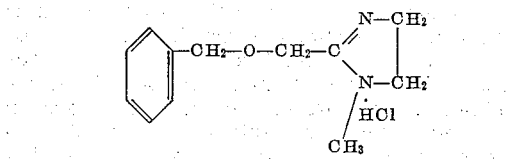

may be obtained when using N-methylethylene diamine.

*Example 3*

A suspension of 16.5 parts by weight of dry sodium benzhydrolate and 6.2 parts by weight of 2-chloromethyl imidazoline hydrochloride in 50 parts by volume of dry dioxane is refluxed for five and one-half hours. After evaporation of the solvent, the residue is worked up as in Example 1. Treatment with ethanolic picric acid and recrystallization from acetone yields 2-benzhydryl-oxymethyl imidazoline picrate of melting point 203–205°. When treated with alkali-chloroform in the usual manner, the picrate is converted to the free base, 2-benzhydryl-oxymethyl imidazoline, which is crystallized from petroleum ether-acetone as colorless needles melting at 102–103°. When treated with methanolic hydrogen chloride and recrystallized from ethanol-ethylmethylketone, 2-benzhydryl - oxymethyl imidazoline hydrochloride of melting point 205.5–207° is obtained.

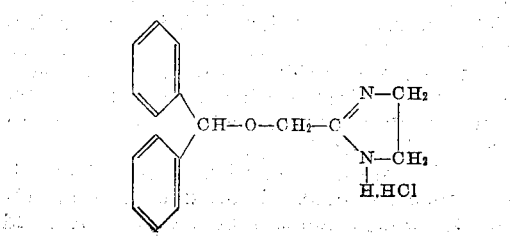

This compound, which is also obtained by the procedure used in Example 2 (via the nitrile and imidoether), is particularly characterized by outstanding antihistaminic activity.

*Example 4*

A solution of 8 parts by weight of β-benzyl-oxypropionitrile (of boiling point 154–160° at 12 mm. as obtained by the reaction of equimolar quantities of benzyl alcohol and acrylonitrile in the presence of a catalytic amount of sodium) in 2.9 parts by volume of absolute ethanol is treated at 0° with 1.9 parts by weight of hydrogen chloride gas. After three days at 0°, the hygroscopic β - benzyl-oxypropion - imidoether hydrochloride of melting point 80–86° and the formula

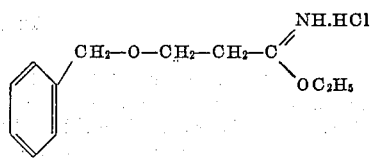

is precipitated with ether.

A solution of 1.22 parts by weight of the above imidoether hydrochloride and 0.33 parts by weight of ethylene diamine in 15 parts by volume of absolute ethanol is refluxed for six hours. After working up as described in Example 2, there is obtained the hygroscopic benzyloxyethyl-imidazoline hydrochloride of the formula

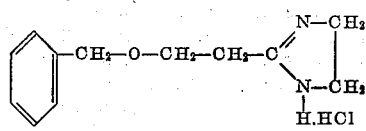

2.43 parts by weight of the imidoether hydrochloride, when shaken with 2.5 parts by volume of ethanolic ammonia, containing 0.204 part by weight of ammonia, for forty-two hours, diluted with ether and recrystallized from ether-ethanol yield β-benzyl-oxypropionamidine hydrochloride of the formula

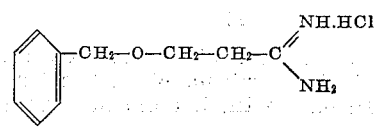

and of melting point 74–76°.

When this amidine hydrochloride is refluxed with an equimolar quantity of ethylene diamine in ethanol solution, β-benzyloxyethyl imidazoline hydrochloride is obtained.

*Example 5*

To a solution of 5.75 parts by weight of sodium in 100 parts by volume of methanol are added 49.5 parts by weight of phenyl benzyl carbinol and the solvent removed under reduced pressure. The white cake is powdered and kept at 130–140° and 0.1 mm. pressure for sixteen hours, and then stored in a stoppered bottle in a desiccator. A sample is swirled in water for about one hour and then titrated with standardized acid, using phenolphthalein as the indicator.

A suspension of 17.60 parts by weight of the thus-obtained sodium alcoholate and 6.20 parts by weight of 2-chloromethyl imidazoline hydrochloride in 70 parts by volume of dioxane is refluxed with vigorous stirring for seven hours. Most of the dioxane is distilled, benzene is added and the distillation repeated. The solution is acidified, the layers separated and the aqueous solution of the imidazoline made alkaline, the product extracted with chloroform, washed with sodium chloride solution, dried and evaporated. The residue is treated with ethanolic picric acid solution, the precipitated picrate converted into the free base in the manner described above, and the resultant imidazoline treated with methanolic hydrogen chloride solution to yield the imidazoline hydrochloride. The latter crystallizes as colorless crystals from methylethylketone-ethanol and melts at 172–174°.

What is claimed is:

1. A member selected from the group consisting of 2-substituted imidazolines of the formula

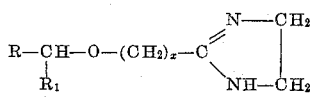

wherein R is an aryl radical, $R_1$ is a member selected from the group consisting of aryl, aralkyl and hydrogen, and $x$ is a small integer, and the hydrochlorides thereof.

2. The imidazoline of the formula

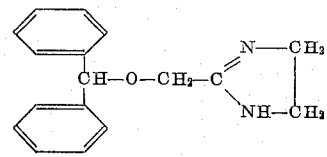

3. The imidazoline of the formula

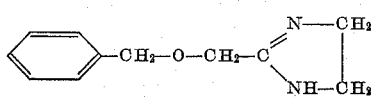

4. The imidazoline of the formula

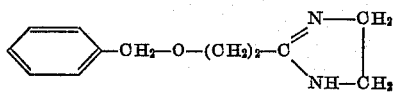

5. The process for preparing an imidazoline of the formula

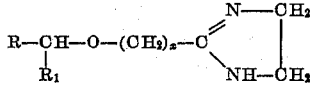

wherein R is an aryl group, $R_1$ is a member selected from the group consisting of aryl, aralkyl and hydrogen, and $x$ is a small integer, which comprises treating a reactive ester of a 2-hydroxyalkyl imidazoline with a metal alcoholate of the formula

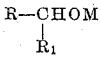

wherein M is a metal selected from the group consisting of alkali and alkaline earth metals, and R and $R_1$ have the aforegiven significances, and recovering the reaction product.

6. The process for preparing an imidazoline which comprises treating a 2-halogenmethyl imidazoline with an alkali metal benzylate, and recovering the reaction product.

7. The process of preparing an imidazoline which comprises treating 2-chloromethyl imidazoline with sodium benzylate, and recovering the reaction product.

8. The process of preparing an imidazoline which comprises treating a 2-halogenmethyl imidazoline with an alkali metal benzhydrolate, and recovering the reaction product.

9. The process of preparing an imidazoline which comprises treating 2-chloromethyl imidazoline with an alkali metal benzhydrolate, and recovering the reaction product.

10. The process of preparing an imidazoline which comprises treating 2-chloromethyl imidazoline with sodium benzhydrolate, and recovering the reaction product.

11. The process of preparing an imidazoline which comprises treating a 2-halogenethyl imidazoline with an alkali metal benzylate, and recovering the reaction product.

12. The process of preparing an imidazoline which comprises treating 2-chloroethyl imidazoline with sodium benzylate, and recovering the reaction product.

CARL DJERASSI.
CAESAR R. SCHOLZ.

REFERENCES CITED

The following references are of record in the file of this patent:

UNITED STATES PATENTS

| Number | Name | Date |
|---|---|---|
| 2,149,473 | Sonn | Mar. 7, 1939 |
| 2,252,723 | Miescher | Aug. 19, 1941 |
| 2,375,611 | Barber | May 8, 1945 |

OTHER REFERENCES

Chemical Abst., vol. 40, pp. 1493–1495 citing Helvitica Chimica Acta, vol. 27, pp. 1762–1776 (1944).